United States Patent
Lang

Patent Number: 6,112,955
Date of Patent: Sep. 5, 2000

[54] LIFTABLE GROUT HOPPER AND DISPENSER

[76] Inventor: Damian Lang, Rte. 1, Box 167-1A, Waterford, Ohio 45786

[21] Appl. No.: 09/241,813

[22] Filed: Feb. 2, 1999

[51] Int. Cl.$^7$ .................................................... F04B 17/06
[52] U.S. Cl. .......................... 222/626; 222/168; 222/413; 222/529
[58] Field of Search .................. 222/168, 413, 222/626, 529, 608; 198/672, 550.01; 241/260.1

[56] References Cited

U.S. PATENT DOCUMENTS

| | | | |
|---|---|---|---|
| 2,365,441 | 12/1944 | Smith | 37/136 |
| 2,606,645 | 8/1952 | Heine | 222/413 |
| 2,901,148 | 8/1959 | Cunningham et al. | 222/185 |
| 3,318,473 | 5/1967 | Jones et al. | 214/621 |
| 4,374,790 | 2/1983 | McGowan | 21/4 |
| 4,798,510 | 1/1989 | Lazenby | 222/168 |
| 5,116,189 | 5/1992 | Shammout . | |
| 5,182,057 | 1/1993 | Johnson . | |
| 5,263,572 | 11/1993 | Hove | 198/672 |
| 5,308,003 | 5/1994 | Koeing | 241/260.1 |
| 5,314,100 | 5/1994 | Deaver | 222/529 |
| 5,458,169 | 10/1995 | Biafore | 21/20 |
| 5,465,829 | 11/1995 | Kruse | 21/10 |
| 5,592,760 | 1/1997 | Kohout | 5/22 |
| 5,715,976 | 2/1998 | Kautz | 222/413 |
| 5,735,386 | 4/1998 | Epp et al. | 198/550.01 |
| 5,823,218 | 10/1998 | Schlect et al. | 5/64 |
| 5,878,921 | 5/1999 | Chase et al. | 222/626 |

*Primary Examiner*—Philippe Derakshani
*Attorney, Agent, or Firm*—Jason H. Foster; Kremblas, Foster, Millard & Pollick

[57] ABSTRACT

A grout hopper and dispenser which may be raised on a fork lift so that grout may be placed in a concrete block wall. The grout hopper and dispenser includes an auger in the bottom thereof which forces the grout out through a tube which is connected to a flexible tube which is used by the workman in directing the grout to the appropriate location. The auger may be remotely controlled by the operator of the forklift truck which has lifted the grout hopper and dispenser into position.

3 Claims, 3 Drawing Sheets

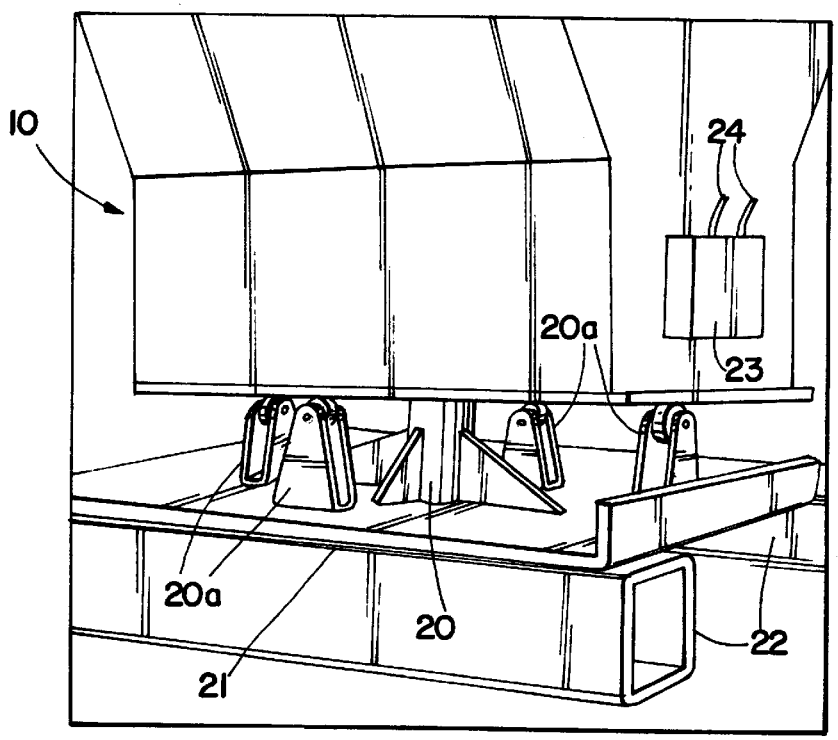
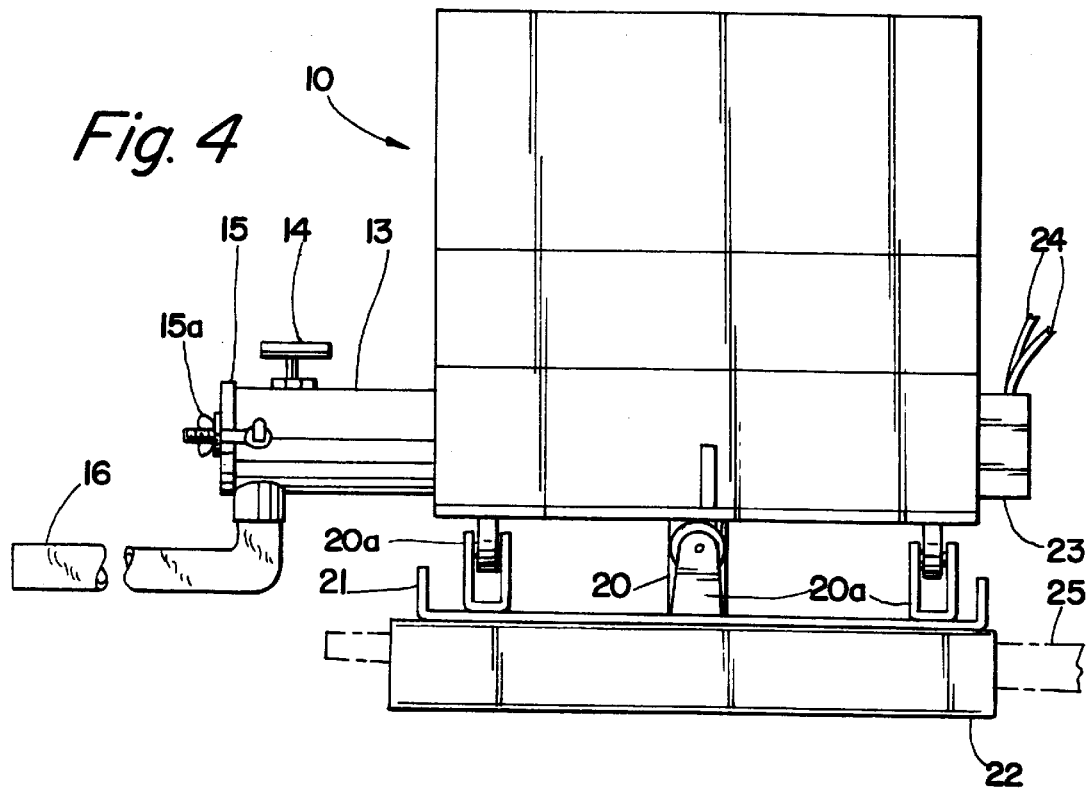

LIFTABLE GROUT HOPPER AND DISPENSER

BACKGROUND OF THE INVENTION

In cement block building construction, it often times is necessary to place grout inside of the cement blocks after the blocks have been laid in place. Historically this has involved labor intensive activity especially if the grout is being placed at the first or second story level. One technique is to use a grout pump which takes a lot of time to set up and dismantle. An average of 200 feet of two inch hose is required to get from the pump to the location. This involves three to four men moving hoses during pumping. The other historical approach is to use a mortar tub, shovel and five gallon buckets. The five gallon buckets are filled from the mortar tub and raised by hand to a place to where the grout or mortar would be put into the cement block. This is also very labor intensive. An attempt to solve this problem is shown in U.S. Pat. No. 5,592,760 Kohout which uses a scoop to load grout into the scoop and there is an auger connected to an opening, the auger being hydraulically operated. In use, the opening is placed near the location where the grout is to be delivered. This limits the flexibility of use of the device and also there is no provision to stop the flow of the grout from the opening.

BRIEF SUMMARY OF THE INVENTION

Applicant's grout hopper and dispenser utilizes a container into which grout may be placed. The bottom of the container has an auger which moves the grout into a tube. When the auger is not turning, it functions as a shut off valve in the tube and when the auger is moving, the grout moves through a flexible hose so that the grout may be placed conveniently in the preferred locations in the cement block construction. The auger is hydraulically operated and remotely controlled by the operator of a forklift which is used to lift the entire container and dispenser into position above the cement block portion of the building into which the mortar or grout is to be introduced. The auger is remotely controlled by the forklift operator responding to visual signals from the workman who is placing the grout in the cement block construction.

It is therefore an object of this invention to provide a combined grout hopper and dispenser in which the flow of the grout from the dispenser may be remotely controlled.

It is a further object of this invention to provide such a grout hopper and dispenser wherein the flow of mortar from the dispenser can be carefully positioned in the cement block with a minimum amount of labor.

This together with other objects of the invention, will become apparent from the following detailed description of the invention and the accompanying drawings.

BRIEF DESCRIPTION OF THE DRAWINGS

FIG. 3. A rear perspective view of the grout hopper and dispenser.

FIG. 4. A side elevation view of the grout hopper and dispenser.

DETAILED DESCRIPTION OF THE INVENTION

Figure 1:
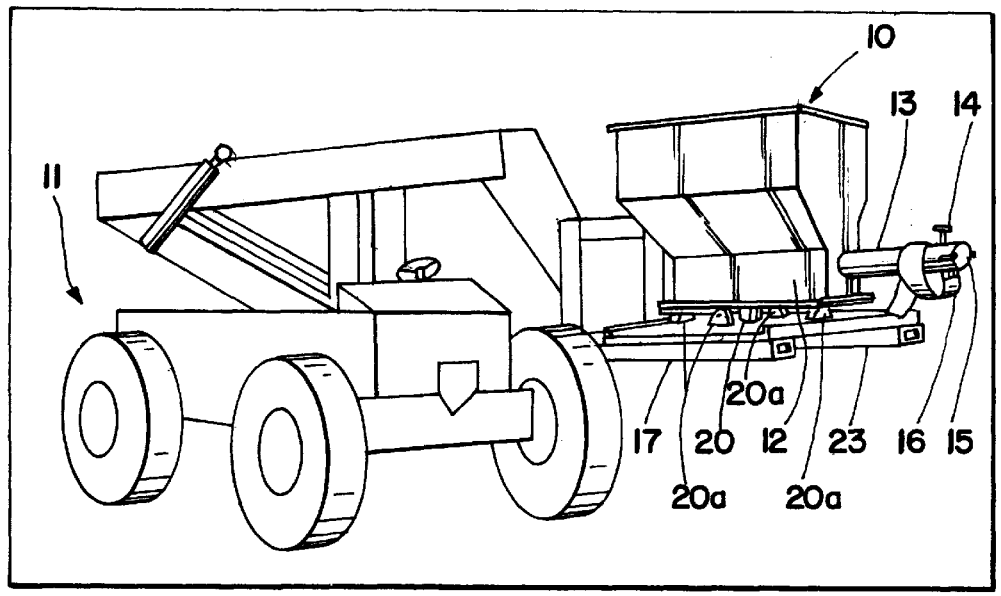
FIG. 1. Applicant's grout hopper and dispenser positioned on a forklift.

FIG. 1 shows Applicant's grout hopper and dispenser 10 on a typical forklift vehicle 11. The grout hopper and dispenser 10 is essentially square in shape with the bottom being narrower than the top and extending from the narrow portion 12 of the grout hopper and dispenser 10 is a tube 13. This tube is provided with a thumb plug 14 through which water may be added to the tube to avoid plugging of the tube by grout in hot weather. Removable cap 15 is located at the end of tube 13 removal of auger for easy cleaning and will be further described below. A flexible hose 16 is connected to the tube 13 to enable the operators to accurately place the grout in the concrete block. The base 17 of the grout hopper and dispenser 10 is so constructed as to fit over the arms of the forklift and also enable the grout hopper and dispenser 10 to swivel. This is shown in greater detail in FIG. 3.

Figure 2:
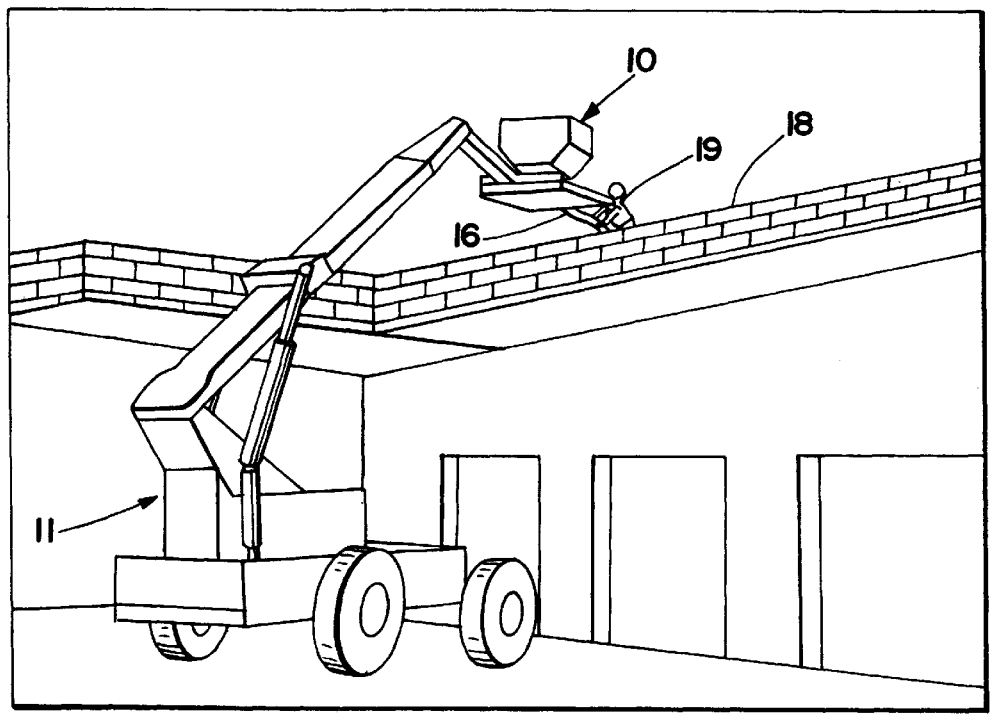
FIG. 2. Applicant's combined grout hopper and dispenser on the forklift with the grout hopper in position so that gravity flow with the help of the auger will permit the grout to be directed to the appropriate position in the concrete block wall under construction.

FIG. 2 shows the forklift vehicle 11 with the grout hopper and dispenser 10 positioned above a concrete block wall 18 so that the grout will be placed precisely where desired in the concrete block wall.

Referring now to FIG. 3 which is a rear perspective view, the grout hopper and dispenser 10 is shown supported on a center post 20 on which it can swivel and also on four rollers 20a—20a which in turn are supported on a platform 21 provided with two tubular members 22—22 of a size adapted to fit over the arms of the forklift. Also shown is the hydraulic motor 23 which is used to drive the auger to be later described and the hydraulic hoses 24—24 which are connected to the hydraulic system on the forklift vehicle 11.

Figure 5:
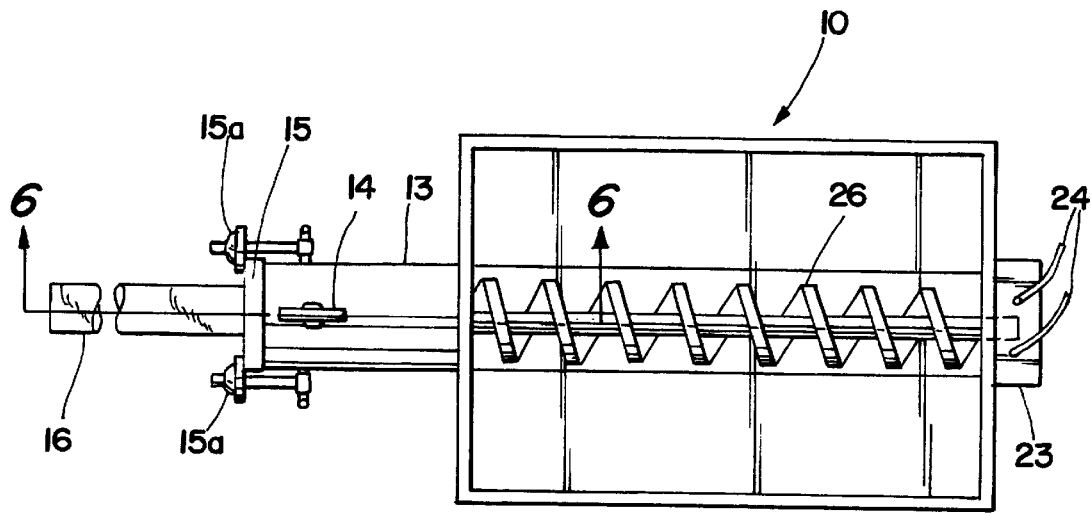
FIG. 5. A top view of the grout hopper and dispenser.
Figure 6:
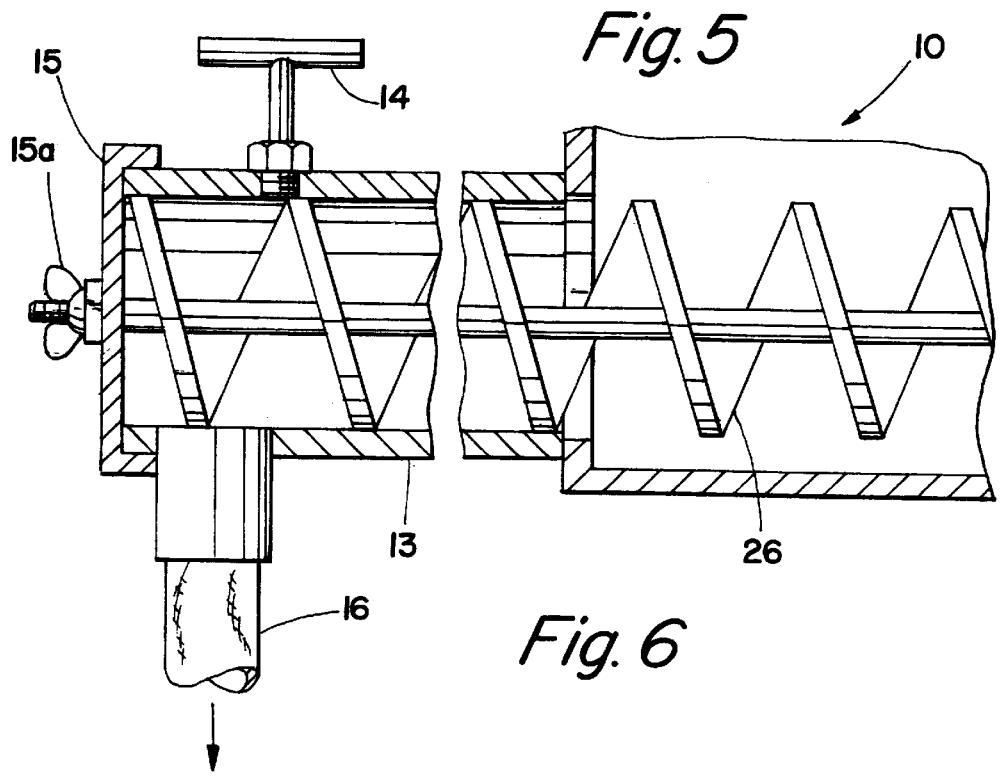
FIG. 6. A section of the dispenser portion of the grout hopper and dispenser on the section lines 6—6.

Referring now to FIG. 4, this is a side elevation view of Applicant's grout hopper and dispenser 10, showing the unit positioned on one of the arms 25 of a forklift shown in dotted outline. The clean out cap 15 is shown being held by clamp 15a and this may be seen more readily in FIG. 5 where there are two clamps 15a—15a which hold the auger removal and clean out cap 15 in place on the tube 13. This top view of the grout hopper and dispenser 10 also shows the auger 26 which is driven by the hydraulic motor 23 and which auger 26 extends the entire length of the grout hopper and dispenser and the full length of the tube 13. This will be more apparent from a review of FIG. 6 which is a sectional view of FIG. 5 on the section lines 6—6.

It will be noted that when the auger 26 is not turning, because of its placement in the tube 13, and because of the nature of the product being delivered, it acts as an effective shut off valve to prevent more of the grout to flow through the tube.

Figure 7:
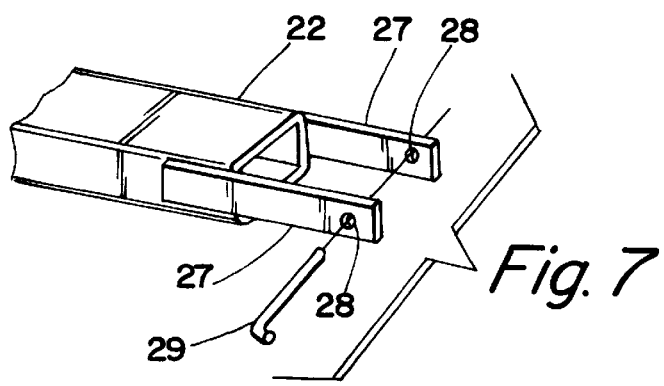
FIG. 7. A perspective view of one of the supports for the grout hopper and dispenser adapted to fit over the forklift arm.

FIG. 7 shows a locking mechanism which may be placed on the ends of member 22 and is provided with two flat members 27—27 provided with holes 28—28 into which a bar 29 may be inserted. The arms of the forklift are flat where they support the weight being lifted but terminate at an upstanding right angle in the portion that is connected to the forklift. So if the forklift arm is inserted into member 22, the upstanding portion of the forklift arm will be closer to the open end of member 22 than the two holes 28. Thus if the bar 29 is inserted therein, it effectively locks the grout hopper and dispenser from possibly sliding off the arms of the forklift.

In use the grout hopper and dispenser 10 may be slid over the forklift arms 25—25 (see FIG. 1) and the grout may be placed in the grout hopper and dispenser. The forklift 11 then moves to the appropriate location adjacent a concrete wall 18 so that the workman 19 may be in a position to utilize the flexible hose 16 to place the grout in the concrete block openings with the auger 26 being controlled by the operator of the forklift in response to commands from the workman 19.

By utilizing Applicant's invention, a minimum amount of labor is required and the workmen are able to place the grout with great accuracy in the concrete block openings. The forklift can move the grout hopper and dispenser 10 slightly on command from the workman 19 to the forklift operator as needed. When the grout is fully discharged from the grout hopper and dispenser 10, it may be readily brought back down to a level where it may be refilled, thus making for a very efficient, cost effective operation.

While this invention has been shown and described with respect to a detailed embodiment thereof, it will be understood by those skilled in the art that various changes in form and detail thereof may be made without departing from the scope of the claims of the invention.

What is claimed is:

1. A grout dispenser comprising:

(a) a grout hopper having four sides of substantially equal length joined together at corners to form a hopper chamber having an opening facing in a first direction, and wherein two of said hopper sides are disposed with lower ends closer together than upper ends forming a narrowed, bottom region of the hopper;

(b) an elongated tube mounted to a first end of said hopper near the narrowed region of the hopper and extending longitudinally away from said hopper to a first tube end;

(c) an aperture formed in a sidewall of said tube, said aperture facing in a second direction substantially opposite to the first direction that the opening of the hopper faces;

(d) a flexible hose mounted to the tube at the aperture, permitting fluid communication between a hose interior and a tube interior;

(e) an auger removably mounted in the hopper and the tube, said auger extending through the tube and within the narrowed region of the hopper to be drivingly linked to a means for rotating the auger, said rotating means mounted at a second, opposite hopper end for rotating said auger to move grout from the narrowed region of said hopper, through said tube and through the aperture in said tube into said flexible hose; and (f) an auger removal cap mounted on the first tube end opposite the rotating means, wherein said cap is removably mounted to said tube for permitting removal of said auger from said tube through the first tube end.

2. A grout dispenser in accordance with claim 1, wherein the aperture is formed near the first tube end.

3. A grout dispenser in accordance with claim 1, further comprising a clean-out aperture formed in the tube near the first tube end.

* * * * *